United States Patent
Rigazio et al.

(10) Patent No.: US 7,729,908 B2
(45) Date of Patent: Jun. 1, 2010

(54) JOINT SIGNAL AND MODEL BASED NOISE MATCHING NOISE ROBUSTNESS METHOD FOR AUTOMATIC SPEECH RECOGNITION

(75) Inventors: Luca Rigazio, Santa Barbara, CA (US); David Kryze, Santa Barbara, CA (US); Keiko Morii, Kanagawa (JP); Nobuyuki Kunieda, Kanagawa (JP); Jean-Claude Junqua, Princeton, NJ (US)

(73) Assignee: Panasonic Corporation, Osaka (JP)

( * ) Notice: Subject to any disclaimer, the term of this patent is extended or adjusted under 35 U.S.C. 154(b) by 1122 days.

(21) Appl. No.: 11/369,936

(22) Filed: Mar. 6, 2006

(65) Prior Publication Data

US 2007/0208559 A1  Sep. 6, 2007

Related U.S. Application Data

(60) Provisional application No. 60/659,052, filed on Mar. 4, 2005.

(51) Int. Cl.
G10L 15/20 (2006.01)
G10L 15/06 (2006.01)
G10L 21/02 (2006.01)

(52) U.S. Cl. .................. 704/233; 704/226; 704/243; 381/94.3

(58) Field of Classification Search .............. 704/226, 704/227, 233, 243, 244, 245; 381/94.2, 94.3
See application file for complete search history.

(56) References Cited

U.S. PATENT DOCUMENTS

| | | | | |
|---|---|---|---|---|
| 4,933,973 A | * | 6/1990 | Porter | 704/233 |
| 5,727,124 A | * | 3/1998 | Lee et al. | 704/233 |
| 6,477,489 B1 | * | 11/2002 | Lockwood et al. | 704/200.1 |
| 6,513,004 B1 | * | 1/2003 | Rigazio et al. | 704/254 |
| 6,529,872 B1 | * | 3/2003 | Cerisara et al. | 704/250 |
| 6,687,672 B2 | * | 2/2004 | Souilmi et al. | 704/237 |
| 6,691,091 B1 | * | 2/2004 | Cerisara et al. | 704/255 |
| 6,804,640 B1 | * | 10/2004 | Weintraub et al. | 704/226 |
| 7,089,182 B2 | * | 8/2006 | Souilmi et al. | 704/234 |
| 7,103,541 B2 | * | 9/2006 | Attias et al. | 704/226 |

(Continued)

OTHER PUBLICATIONS

Brayda et al., "Sensitivity Analysis of Noise Robustness Methods", IEEE International Conference on Acoustics, Speech, and Signal Processing, 2004. May 17-21, 2004, vol. 1, pp. 1037-1040.*

(Continued)

*Primary Examiner*—Martin Lerner
(74) *Attorney, Agent, or Firm*—Harness, Dickey & Pierce, P.L.C.

(57) ABSTRACT

A noise robustness method operates jointly in a signal domain and a model domain. For example, energy is added in the signal domain for frequency bands where an actual noise level of an incoming signal is lower than a noise level used to train models, thus obtaining a compensated signal. Also, energy is added in the model domain for frequency bands where noise level of the incoming signal or the compensated signal is higher than the noise level used to train the models. Moreover, energy is never removed, thereby avoiding problems of higher sensitivity of energy removal to estimation errors.

16 Claims, 4 Drawing Sheets

U.S. PATENT DOCUMENTS

2002/0165712 A1* 11/2002 Souilmi et al. .............. 704/233
2003/0050780 A1* 3/2003 Rigazio et al. .............. 704/246
2004/0190732 A1* 9/2004 Acero et al. ............... 381/94.1
2004/0204937 A1* 10/2004 Zhang et al. ................ 704/233
2005/0080623 A1* 4/2005 Furui et al. ................. 704/233

OTHER PUBLICATIONS

Cerisara et al., "Environmental Adaptation Based on First Order Approximation", IEEE International Conference on Acoustics, Speech, and Signal Processing, 2001. May 7-11, 2001, vol. 1, pp. 213 to 216.*

* cited by examiner

JOINT SIGNAL AND MODEL BASED NOISE MATCHING NOISE ROBUSTNESS METHOD FOR AUTOMATIC SPEECH RECOGNITION

CROSS-REFERENCE TO RELATED APPLICATIONS

This application claims the benefit of U.S. Provisional Application No. 60/659,052, filed on Mar. 4, 2005. The disclosure of the above application is incorporated herein by reference in its entirety for any purpose.

FIELD OF THE INVENTION

The present invention generally relates to automatic speech recognition, and relates in particular to noise robustness methods.

BACKGROUND OF THE INVENTION

Noise robustness methods for Automatic Speech Recognition (ASR) are historically carried out either in the signal domain or in the model domain. Referring to FIG. 1, signal domain methods basically try to "clean-up" the incoming signal 100 from the corrupting noise. In particular, a noise removal module 102 removes noise in accordance with noise estimates produced by noise estimation module 104. Then extracted features obtained from the adjusted signal by feature extraction module 106 are pattern matched to acoustic models 108 by pattern matching module 110 to obtain recognition 112. Turning to FIG. 2, model domain methods try to improve the performance of pattern matching by modifying the acoustic models so that they are adapted to the current noise level, while leaving the input signal 200 unchanged. In particular, a noise estimation module 202 estimates noise in the input signal 200, and model compensation module 204 adjusts the acoustic models 206 based on these noise estimates. Then, extracted features obtained from the unmodified input signal 200 by feature extraction module 208 are pattern matched to the adjusted acoustic models 206 by pattern matching module 210 to achieve recognition 212.

Noise robustness algorithms are a key for successful deployment of ASR technology in real applications and a vibrant sector of the ASR research community. However the noise robustness methods available today still have limitations. For instance, model-based methods clearly outperform signal-based methods, but may require clean speech databases for the training of the acoustic models. As for signal-based methods, while they under perform model-based methods, they have the advantage that they can be used with acoustic models that are trained in noisy conditions. This advantage is important as sometimes clean training data is not available for certain tasks, and also noisy training data recorded specifically for a certain task is the best way to obtain good task-specific acoustic models.

What is needed is a way to obtain the advantages of signal based methods, plus the improved performance of model-based methods. The present invention fulfills this need.

SUMMARY OF THE INVENTION

In accordance with the present invention, a noise robustness method operates jointly in a signal domain and a model domain. For example, energy is added in the signal domain at least for frequency bands where an actual noise level of an incoming signal is lower than a noise level used to train models, thus obtaining a compensated signal. Also, energy is added in the model domain for frequency bands where noise level of the incoming signal or the compensated signal is higher than the noise level used to train the models. Moreover, energy is never removed, thereby avoiding problems of higher sensitivity of energy removal to estimation errors.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

The present invention avoids problems regarding higher sensitivity of energy removal to estimation errors. This sensitivity is well-documented in L. Brayda, L. Rigazio, R. Boman and J-C Junqua, "*Sensitivity Analysis of Noise Robustness Methods*", in Proceedings of ICASSP 2004, Montreal, Canada. The invention accomplishes this improvement by eliminating the need to remove noise.

The noise robustness method of the present invention provides a solution to the current limitations of signal-based and model-based noise robustness methods by providing a noise robustness method that operates jointly in the signal-domain and model-domain. This approach provides performance level superiority of a model-based method, while still allowing for advantages of signal-based methods, such as allowing the acoustic models to be trained on noisy data.

Two basic enabling principles of the invention are: (a) adding energy in the spectral-domain bears a lower cepstral-domain sensitivity to (spectral domain) estimation errors than subtracting energy; and (b) subtracting noise in the signal domain is somewhat equivalent to adding noise to the model. For these reasons the noise robustness method of the present invention performs the following steps: (a) add energy in the (signal) domain for the frequency bands where the actual noise level of the incoming signal is lower than the noise level used to train the models; and (b) add energy in the model domain for the bands where the actual noise level of the incoming signal is higher than the noise level used to train the models. Therefore, the noise robustness method of the present embodiment only adds energy, either in the signal domain or in the model domain, but never attempts to remove energy, since removing energy bears much higher sensitivity to estimation errors.

Figure 1:
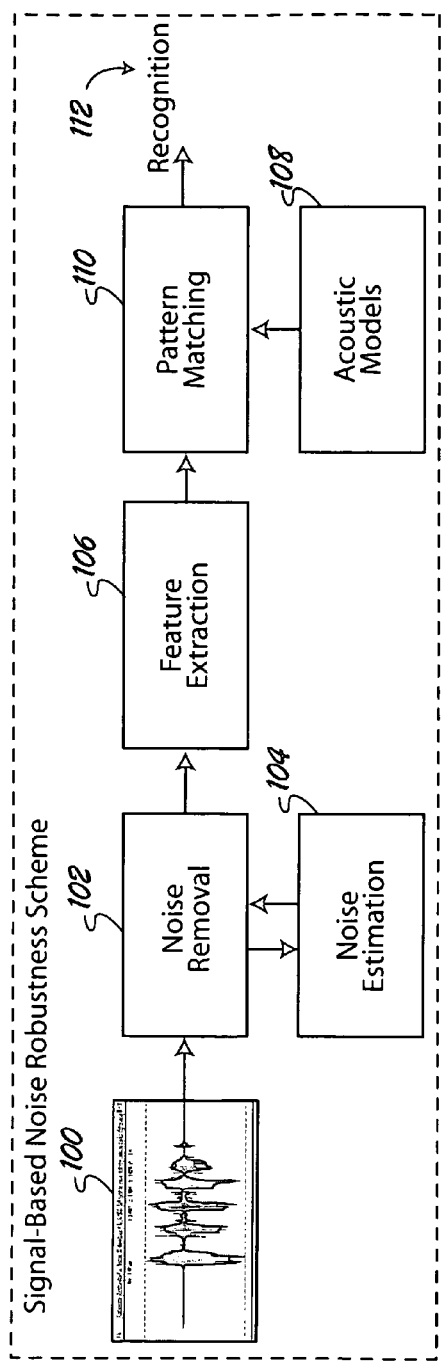
FIG. 1 is a block diagram illustrating a signal-based noise robustness method in accordance with the prior art.
Figure 2:
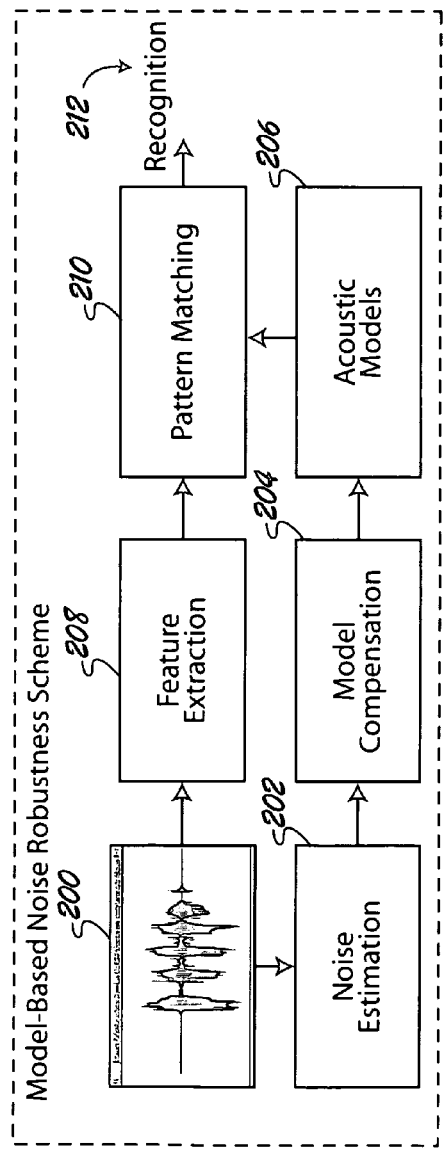
FIG. 2 is a block diagram illustrating a model-based noise robustness method in accordance with the prior art.
Figure 3:
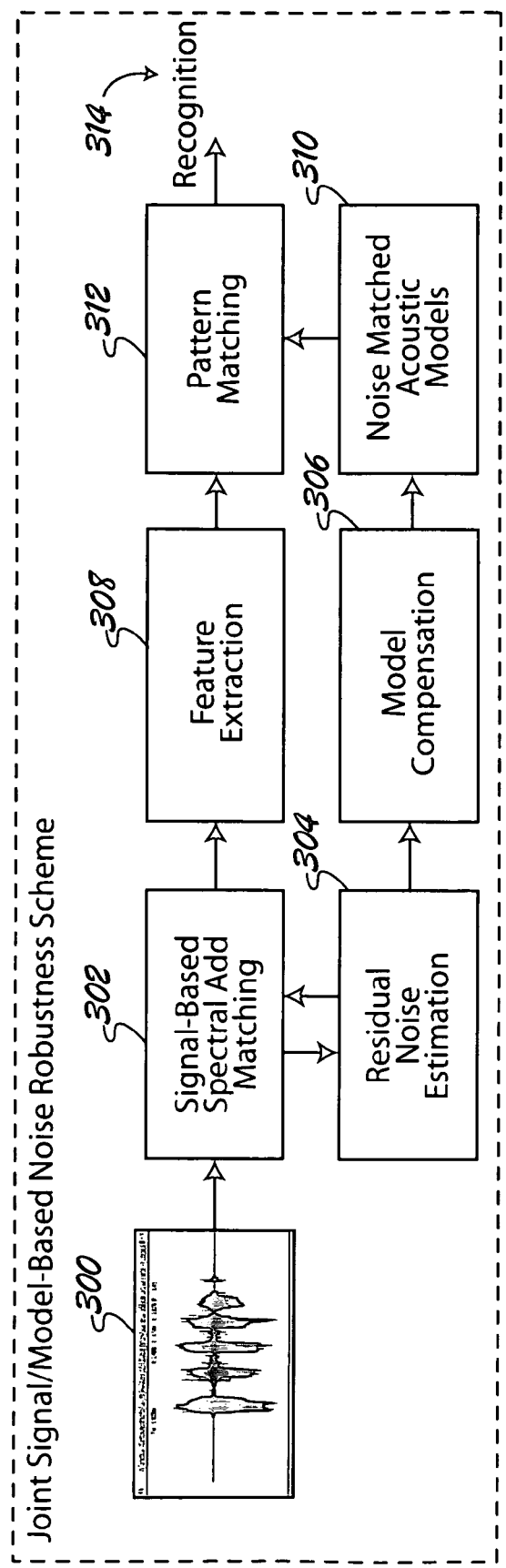
FIG. 3 is a block diagram illustrating a joint signal/model-based noise robustness method in accordance with the present invention.

The noise robustness method of the present invention is explored in FIG. 3. An input signal 300 is first processed by a signal-based spectral add matching module 302, which adds energy to frequency bands of the signal 300 as needed to match the training noise levels at those frequencies for the trained models. Then, a residual noise estimation module 304 determines which frequency bands of the signal 300 have more noise than the trained models at those frequency bands. A model compensation module 306 receives this information and adds energy to the frequency bands of the models as required to have the models match the input signal 300 at those frequencies. Then extracted features of the compensated signal obtained by feature extraction module 308 are pattern matched to noise matched acoustic models 310 by pattern matching module 312 to achieve recognition 314.

Alternatively or additionally, module 302 can add noise in the time domain without any frequency analysis. In other words, the noise used to train the models can be added to the incoming signal in order to ensure that all frequencies of the incoming signal have at least as much noise as the corresponding frequencies of the models. Then the frequency analysis can be performed on the compensated signal so that noise can be added to the models at specific frequency bands in order to cause them to match the noise levels of the compensated signal at those bands.

Figure 4:
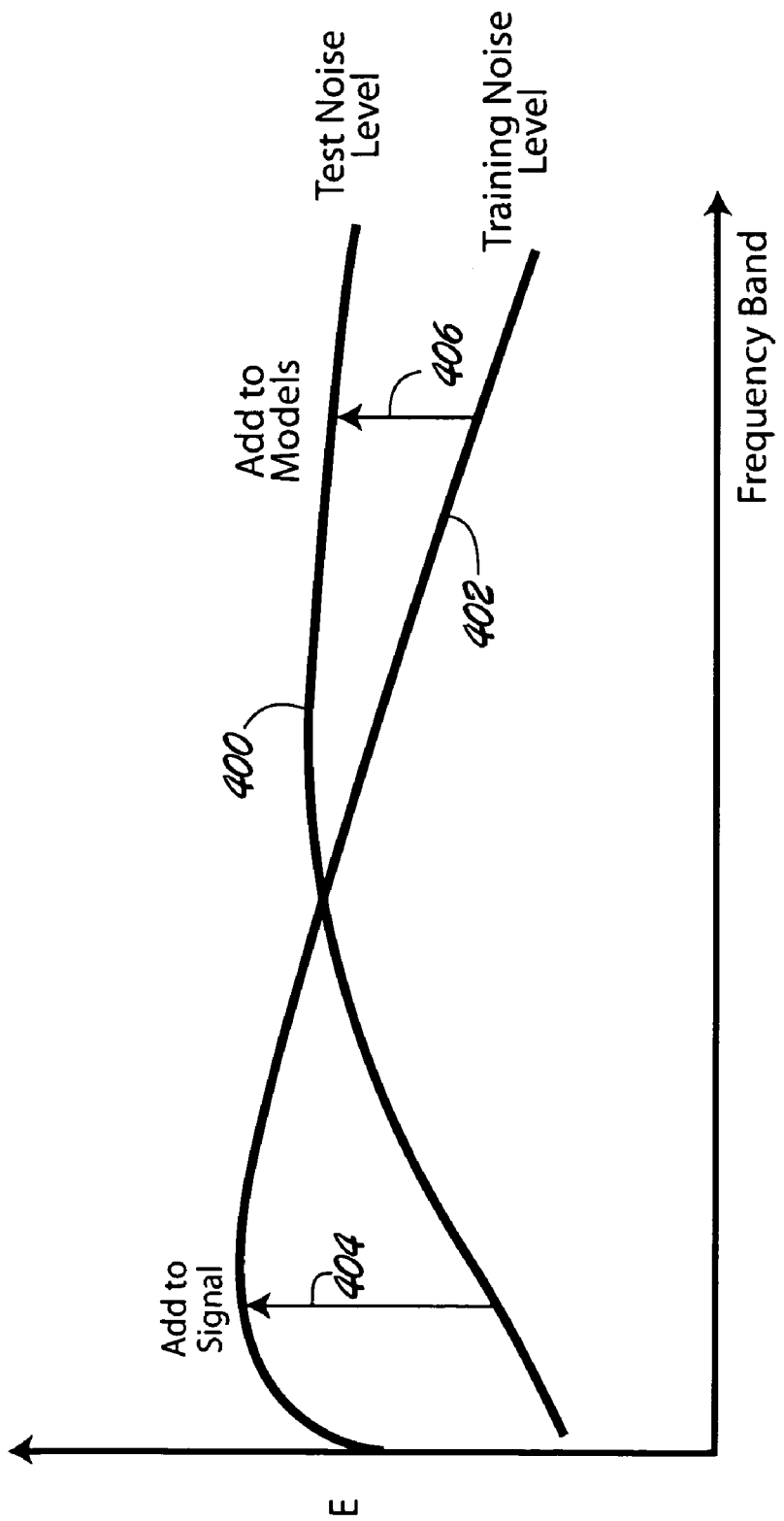
FIG. 4 is a graph illustrating selective, domain-specific adding of energy to a signal based on comparison of actual and training noise levels.

The selective, domain-specific adding of energy is further explored in FIG. 4. For example, where energy level is on the ordinate axis, and frequency is on the abscissa. For each frequency band of an incoming signal, the signal noise level 400 at a particular frequency band can be compared to the training noise level 402 at that frequency band. When the training noise level is higher than the signal noise level as at 404, energy can be added in the signal domain. When the signal noise level is higher than the training noise level as at 406, energy can be added in the model domain. In some embodiments, the amount of energy added to a frequency band is equivalent to a magnitude difference at that frequency band between the signal noise level 400 and the training noise level 402.

The noise robustness method of the present invention provides higher recognition performance, especially at low SNRs, compared to either signal-based or model-based robustness methods. Also it allows use of models that are trained with noisy data. Finally it provides a scalable solution to the noise robustness problem that combines the strengths of the previously separated methods of signal and model based robustness.

Figure 5:
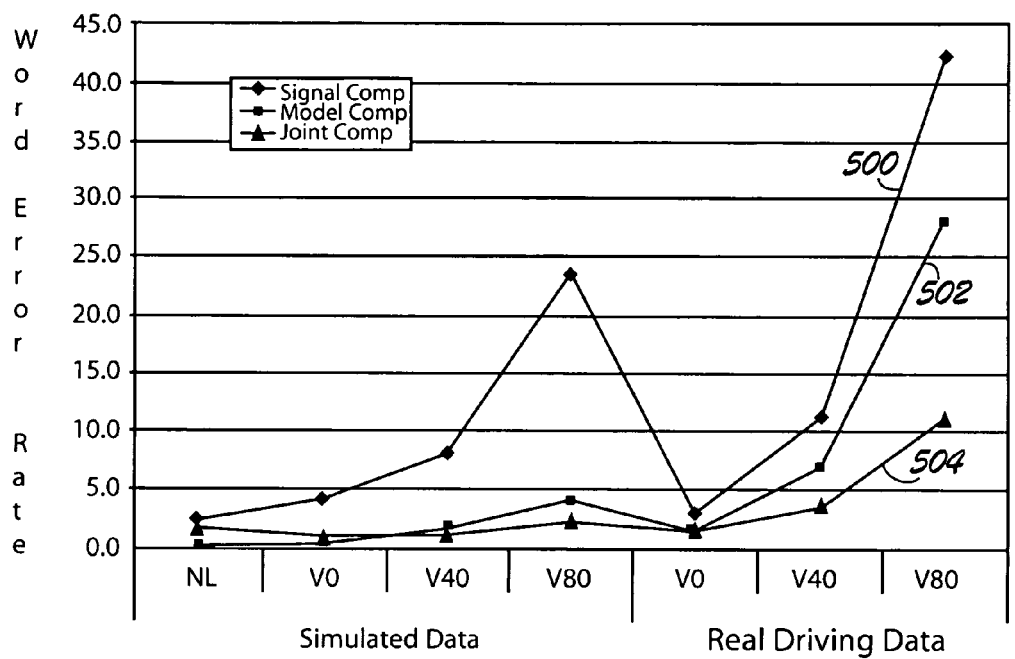
FIG. 5 is a graph presenting in-car evaluation results for the noise robustness method according to the present invention.

Referring to FIG. 5, a graph presents simulated (left) and actual (right) results of in-car speech evaluations of the noise robustness method according to the present invention using the following abbreviations: (a) NL: noiseless; (b) V0: idling; (c) V40: street drive; (d) V80: highway drive. Word error rate on the ordinate axis is plotted for signal compensation 500 alone, model compensation 502 alone, and joint compensation 504 using the noise robustness method of the present invention.

The noise robustness method of the present invention is also effective for channel distorted input speech. If a noise robustness system applying the noise robustness method of the present invention is prepared with multi-conditioned acoustic models the area of effective input must be improved.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A noise robustness method operating jointly in a signal domain and a model domain, comprising:
   adding energy in frequency bands of the signal domain corresponding to frequency bands of an input signal having an actual noise level that is less than a noise level used to train an acoustic model, thereby obtaining a compensated signal, wherein said input signal is indicative of speech input;
   adding energy in frequency bands using a model compensation module of the model domain corresponding to frequency bands of at least one of the input signal and the compensated signal having a noise level that is higher than the noise level used to train the acoustic model, thereby obtaining a noise matched acoustic model.

2. The method of claim 1, further comprising, for each frequency band of an incoming signal, comparing signal noise level at a particular frequency band to the training noise level at that frequency band.

3. The method of claim 2, further comprising adding an amount of energy to a frequency band that is equivalent to a magnitude difference at that frequency band between the signal noise level and the training noise level.

4. The method of claim 1, further comprising extracting features from the incoming signal following adding of energy in the signal domain, thereby obtaining extracted features.

5. The method of claim 4, further comprising performing pattern matching between the noise matched acoustic model and the extracted features, thereby achieving automatic speech recognition.

6. The method of claim 1, further comprising employing a multi-conditioned acoustic model.

7. The method of claim 1, wherein adding energy in the signal domain includes only adding energy for the frequency bands where the actual noise level of the incoming signal is less than the noise level used to train the acoustic model.

8. The method of claim 1 further comprising refraining from removing energy in either of the signal domain and the model domain.

9. An automatic speech recognizer implementing a noise robustness method operating jointly in a signal domain and a model domain, comprising:
   a signal-based spectral add matching module adding energy to frequency bands of an input signal having an actual noise level that is lower than a noise level used to train an acoustic model, thereby obtaining a compensated signal; and
   a model compensation block adding energy to frequency bands of the acoustic model corresponding to frequency bands of at least one of the incoming signal or the compensated signal having a noise level that is higher than the noise level used to train the acoustic model, thereby obtaining noise matched acoustic model
   wherein energy is not removed from frequency bands of the input signal or the acoustic models.

10. The system of claim 9, wherein said signal-based spectral add matching module adds energy to frequency bands to have noise levels of the trained acoustic model match noise levels of the input signal at those frequencies.

11. The system of claim 9, wherein said model compensation block adds energy to frequency bands to have noise levels of the trained acoustic model match noise levels of the input signal at those frequencies.

12. The system of claim 9, further comprising a residual noise estimation module estimating noise levels for frequency bands of the input signal that have more noise than the trained acoustic model at those frequency bands, thereby obtaining frequency specific noise estimates.

13. The system of claim 9, further comprising a pattern matching module performing pattern matching between the noise matched acoustic model and extracted features obtained from the compensated signal, thereby achieving automatic speech recognition.

14. The system of claim 13, further comprising extracting features from the compensated signal, thereby obtaining the extracted features.

15. The system of claim 9, wherein the acoustic model includes a multi-conditioned acoustic model.

16. The system of claim 9, wherein said signal-based spectral add matching module only adds energy for the frequency bands where the actual noise level of the incoming signal is less than the noise level used to train the model.

* * * * *

UNITED STATES PATENT AND TRADEMARK OFFICE
CERTIFICATE OF CORRECTION

PATENT NO.         : 7,729,908 B2                                   Page 1 of 1
APPLICATION NO.  : 11/369936
DATED              : June 1, 2010
INVENTOR(S)       : Luca Rigazio et al.

It is certified that error appears in the above-identified patent and that said Letters Patent is hereby corrected as shown below:

On the title page item 75 under Inventors, please delete "; Jean-Claude Junqua, Princeton, NJ (US)"

Signed and Sealed this

Twenty-first Day of September, 2010

David J. Kappos
*Director of the United States Patent and Trademark Office*